United States Patent
Ou et al.

(10) Patent No.: US 12,203,809 B2
(45) Date of Patent: Jan. 21, 2025

(54) CHROMATICITY MEASUREMENT METHOD AND DEVICE FOR CALIBRATION OF TILED LED DISPLAY SCREEN

(71) Applicants: WUHAN JINGCE ELECTRONIC GROUP CO., LTD, Hubei (CN); WUHAN JINGLI ELECTRONIC TECHNOLOGY CO., LTD, Hubei (CN)

(72) Inventors: Changdong Ou, Wuhan (CN); Zengqiang Zheng, Wuhan (CN); Shiwen Luo, Wuhan (CN); Zhikun Hong, Wuhan (CN); Zhou Wang, Wuhan (CN); Fan Zhong, Wuhan (CN); Luning Liu, Hubei (CN); Xiaofan Feng, Wuhan (CN); Ronghua Liu, Hubei (CN); Yafei Shen, Wuhan (CN); Kai Chen, Wuhan (CN)

(73) Assignees: Wuhan Jingce Electronic Group Co., LTD, Wuhan (CN); Wuhan Jingli Electronic Technology Co., LTD, Wuhan (CN)

( * ) Notice: Subject to any disclaimer, the term of this patent is extended or adjusted under 35 U.S.C. 154(b) by 33 days.

(21) Appl. No.: 17/997,205

(22) PCT Filed: Mar. 31, 2021

(86) PCT No.: PCT/CN2021/084397
§ 371 (c)(1),
(2) Date: Oct. 26, 2022

(87) PCT Pub. No.: WO2022/141881
PCT Pub. Date: Jul. 7, 2022

(65) Prior Publication Data
US 2023/0314223 A1  Oct. 5, 2023

(30) Foreign Application Priority Data

Dec. 28, 2020  (CN) .......................... 202011580421.8

(51) Int. Cl.
*G09G 3/32* (2016.01)
*G01J 3/02* (2006.01)
(Continued)

(52) U.S. Cl.
CPC ............. *G01J 3/506* (2013.01); *G01J 3/0208* (2013.01); *G01J 3/0218* (2013.01);
(Continued)

(58) Field of Classification Search
CPC ........ G01J 3/506; G01J 3/0208; G01J 3/0218; G01J 3/2823; G01J 2003/2866;
(Continued)

(56) References Cited

U.S. PATENT DOCUMENTS

2008/0309766 A1* 12/2008 Lin ........................ H04N 9/69
348/179
2014/0009485 A1*  1/2014 Asanuma ................ G09G 5/02
345/590
(Continued)

FOREIGN PATENT DOCUMENTS

| CN | 101813520 A | 8/2010 |
|---|---|---|
| CN | 102111624 A | 6/2011 |

(Continued)

OTHER PUBLICATIONS

European Patent Office, English abstract for CN101813520A, printed on Oct. 26, 2022.
(Continued)

*Primary Examiner* — Jitesh Patel
(74) *Attorney, Agent, or Firm* — CAHN & SAMUELS, LLP

(57) ABSTRACT

A chromaticity measurement method and device for calibration of a tiled LED display screen (A) having the advan-
(Continued)

tages of convenience in operation and accurate measurement. The chromaticity measurement method includes: imaging emergent light from the tiled LED display screen (A) with an objective lens (1); receiving a light beam from the objective lens (1) with a transflective lens (2) and performing beam splitting to obtain a first light beam and a second light beam; receiving the first light beam with an imaging sensor (3) to obtain an original image; receiving the second light beam in a two-dimensional lattice form with a movable optical fiber array coupling device (4), and converting the second light beam into one-dimensional lattice light; and obtaining chromaticity information and spectrum information of a plurality of regions on the tiled LED display screen (A) according to the one-dimensional lattice light with a spectrum acquisition device (5). The emergent light is split, analysis is performed with the imaging sensor (3), chromaticity measurement and spectrum measurement are performed with a spectrometer (52), and calibration and correction are performed on the imaging sensor (3) on the basis of measurement results of the spectrometer (52).

10 Claims, 4 Drawing Sheets

(51) Int. Cl.
  *G01J 3/28* (2006.01)
  *G01J 3/50* (2006.01)
(52) U.S. Cl.
  CPC .............. *G01J 3/2823* (2013.01); *G09G 3/32* (2013.01); *G01J 2003/2866* (2013.01); *G09G 2300/026* (2013.01); *G09G 2320/0693* (2013.01)
(58) Field of Classification Search
  CPC ........ G01J 3/0221; G01J 3/0248; G01J 3/524; G01J 3/501; G09G 3/32; G09G 2300/026; G09G 2320/0693
  See application file for complete search history.

(56) References Cited

U.S. PATENT DOCUMENTS

| | | | | |
|---|---|---|---|---|
| 2015/0009501 | A1* | 1/2015 | Sun | G01J 1/0462 356/402 |
| 2016/0125582 | A1* | 5/2016 | Adams | G09G 3/006 382/141 |
| 2017/0205277 | A1* | 7/2017 | Ohtsuki | G01J 1/0403 |
| 2018/0047325 | A1* | 2/2018 | Biwa | G09G 3/2003 |
| 2021/0125570 | A1* | 4/2021 | Kang | G09G 3/364 |

FOREIGN PATENT DOCUMENTS

| | | |
|---|---|---|
| CN | 102213615 A | 10/2011 |
| CN | 104457600 A | 3/2015 |
| CN | 106154715 A | 11/2016 |
| CN | 108682365 A | 10/2018 |
| JP | H10115575 A | 5/1998 |

OTHER PUBLICATIONS

European Patent Office, English abstract for CN102111624A, printed on Oct. 26, 2022.
European Patent Office, English abstract for CN102213615A, printed on Oct. 26, 2022.
European Patent Office, English abstract for CN104457600A, printed on Oct. 26, 2022.
European Patent Office, English abstract for CN106154715A, printed on Oct. 26, 2022.
European Patent Office, English abstract for CN108682365A, printed on Oct. 26, 2022.
European Patent Office, English abstract for JPH10115575, printed on Oct. 26, 2022.
China National Intellectual Property Administration, International Search Report for PCT App. No. PCT/CN2021/084397, pp. 3-4.
China National Intellectual Property Administration, Written Opinion for PCT App. No. PCT/CN2021/084397, pp. 1-4.

* cited by examiner

CHROMATICITY MEASUREMENT METHOD AND DEVICE FOR CALIBRATION OF TILED LED DISPLAY SCREEN

FIELD OF THE INVENTION

The present application relates to the technical field of colorimeter, in particular to a chromaticity measurement method and device for calibration of a tiled LED display screen.

BACKGROUND OF THE INVENTION

Inorganic light emitting diodes (LEDs) such as GaN (gallium nitride), have the advantage of long service life. However, due to the narrow emission spectrum lines, it is difficult for the semiconductor process to ensure that the central spectrum lines and spectrum widths are completely consistent, resulting in color deviation when manufacturing large display screens, and color adjustment is required. However, the premise of the adjustment of carefully chosen colors is accurate color measurement, while the large LED display screen is formed through tiling a plurality of display screens, and there are large differences in the spectrum between each of the display screens.

At present, one case is a rotary imaging colorimeter using an XYZ filter, but due to the poor accuracy of the XYZ filter and the narrow spectrum line of the LED, the measurement error is large; the other case is to measure the spectrum information of the center point by means of a single-point spectrometer, and use the center point to calibrate, but the spectrum of other regions cannot be easily measured, so the measurement errors of other regions except the central region are relatively large.

Therefore, in order to meet the current use requirements, a new chromaticity measurement device is urgently needed.

SUMMARY OF THE INVENTION

The present application provides a chromaticity measurement method and device for calibration of a tiled LED display screen, which performs splitting on an emergent light by means of a transflective lens; on the one hand, analysis is performed by means of a imaging sensor, and on the other hand, chromaticity measurement and spectrum measurement are performed by means of a spectrometer; and calibration and correction are performed on the imaging sensor on the basis of measurement results of the spectrometer, which has the advantages of low cost, convenient operation and accurate measurement.

In a first aspect, the present application provides a chromaticity measurement method for calibration of a tiled LED display screen, and the chromaticity measurement method for calibration of a tiled LED display screen comprises the following steps:
performing imaging on emergent light from a tiled LED display screen by means of an objective lens;
receiving a light beam from the objective lens and performing beam splitting by means of a transflective lens to obtain a first light beam and a second light beam;
receiving the first light beam by means of an imaging sensor to obtain an original image;
receiving the second light beam in a two-dimensional lattice form by means of a movable optical fiber array coupling device, and converting the received second light beam into one-dimensional lattice light; and
obtaining chromaticity information and spectrum information of a plurality of regions on the tiled LED display screen according to the one-dimensional lattice light by means of a spectrum acquisition device.

Preferably, the imaging sensor is located on an imaging plane of the first light beam, and the optical fiber array coupling device is configured to be movably arranged on a conjugate image plane of the second light beam.

Specifically, the tiled LED display screen is formed through tiling a plurality of sub-display screens; and
the step of receiving the second light beam in a two-dimensional lattice form by means of a movable optical fiber array coupling device, and converting the second light beam into one-dimensional lattice light further comprises the following steps:
moving the optical fiber array coupling device, and registering the optical fiber array coupling device with the plurality of the sub-display screens, so that the optical fiber array coupling device can simultaneously obtain the chromaticity information and the spectrum information of a plurality of target regions.

Further, the tiled LED display screen is formed through tiling a plurality of sub-display screens; and
the step of receiving the second light beam in a two-dimensional lattice form by means of a movable optical fiber array coupling device, and converting the second light beam into one-dimensional lattice light further comprises the following steps:
moving the optical fiber array coupling device for a plurality of times to acquire the chromaticity information and the spectrum information of the target sub-display screen each time the optical fiber array coupling device is moved until the chromaticity information and the spectrum information are acquired at least once for each of the sub-display screens.

Specifically, the step of moving the optical fiber array coupling device for a plurality of times to acquire the chromaticity information and the spectrum information of the target sub-display screen each time the optical fiber array coupling device is moved until the chromaticity information and the spectrum information are acquired at least once for each of the sub-display screens comprises the following steps:
calculating a distance and a number of times the optical fiber array coupling device needs to move according to the number of the sub-display screens; and
moving the optical fiber array coupling device for a plurality of times according to the distance and the number of times until the chromaticity information and the spectrum information are acquired at least once for each of the sub-display screens.

Further, the method further comprises the following steps:
obtaining a calibration matrix of the corresponding region of the tiled LED display screen according to the spectrum information and the chromaticity information of the corresponding region of the tiled LED display screen; and
calibrating the original image according to the calibration matrix.

In a second aspect, the present application provides a chromaticity measurement device for calibration of a tiled LED display screen, and the device comprises:
an objective lens, which is configured to perform imaging on emergent light from a tiled LED display screen;

a transflective lens, which is configured to perform beam splitting on a light beam received from the objective lens to obtain a first light beam and a second light beam;

an imaging sensor, which is configured to perform imaging according to the first light beam;

an optical fiber array coupling device, which is movably arranged at an emergence end of the second light beam, and configured to collect the second light beam in a two-dimensional lattice form, and convert the received second light beam into one-dimensional lattice light; and a spectrum acquisition device, which is configured to obtain chromaticity information and spectrum information of a plurality of regions on the tiled LED display screen according to the one-dimensional lattice light.

Preferably, the imaging sensor is located on an imaging plane of the first light beam, and the optical fiber array coupling device is configured to be movably arranged on a conjugate image plane of the second light beam.

Specifically, the optical fiber array coupling device comprises a point scanning component, which is configured to collect the second light beam in a two-dimensional lattice form to obtain the two-dimensional lattice light, and convert the two-dimensional lattice light into the one-dimensional lattice light for emergence.

Specifically, the point scanning component comprises:
a plurality of light guide components; wherein
one ends of the plurality of the light guide components are arranged in a two-dimensional lattice form, and are configured to collect the second light beam to obtain the two-dimensional lattice light; and
the other ends of the plurality of the light guide components are arranged in a straight line, so as to convert the two-dimensional lattice light into one-dimensional lattice light for emergence.

The beneficial effects of the technical solution provided in the present application are as follows:

The present application performs splitting on the emergent light by means of a transflective lens; on the one hand, analysis is performed by means of an imaging sensor, and on the other hand, chromaticity measurement and spectrum measurement is performed by means of an imaging spectrometer (spectrum acquisition device), and the imaging spectrometer can easily perform the chromaticity measurement and the spectrum measurement on the emergent light of the tiled LED display screens in a plurality of regions by means of a movable design method; through moving the optical fiber array coupling device for a plurality of times, it can ensure that each small screen can be measured at least once, so as to adapt to the accurate color coordinate measurement of the tiled display screen with any number of pieces; and calibration and correction are performed on the imaging sensor on the basis of the measurement results of the spectrometer, which has the advantages of low cost, convenient operation and accurate measurement.

BRIEF DESCRIPTION OF THE DRAWINGS

In order to better illustrate the technical solution in the embodiments of the present application, the following will briefly introduce the drawings needed in the description of the embodiments, and it is clear that the drawings in the following description are part of embodiments of the present application, for those of ordinary skill in the art, other drawings may also be obtained based on these drawings without any inventive effort.

IN THE FIGURES

Figure 1:
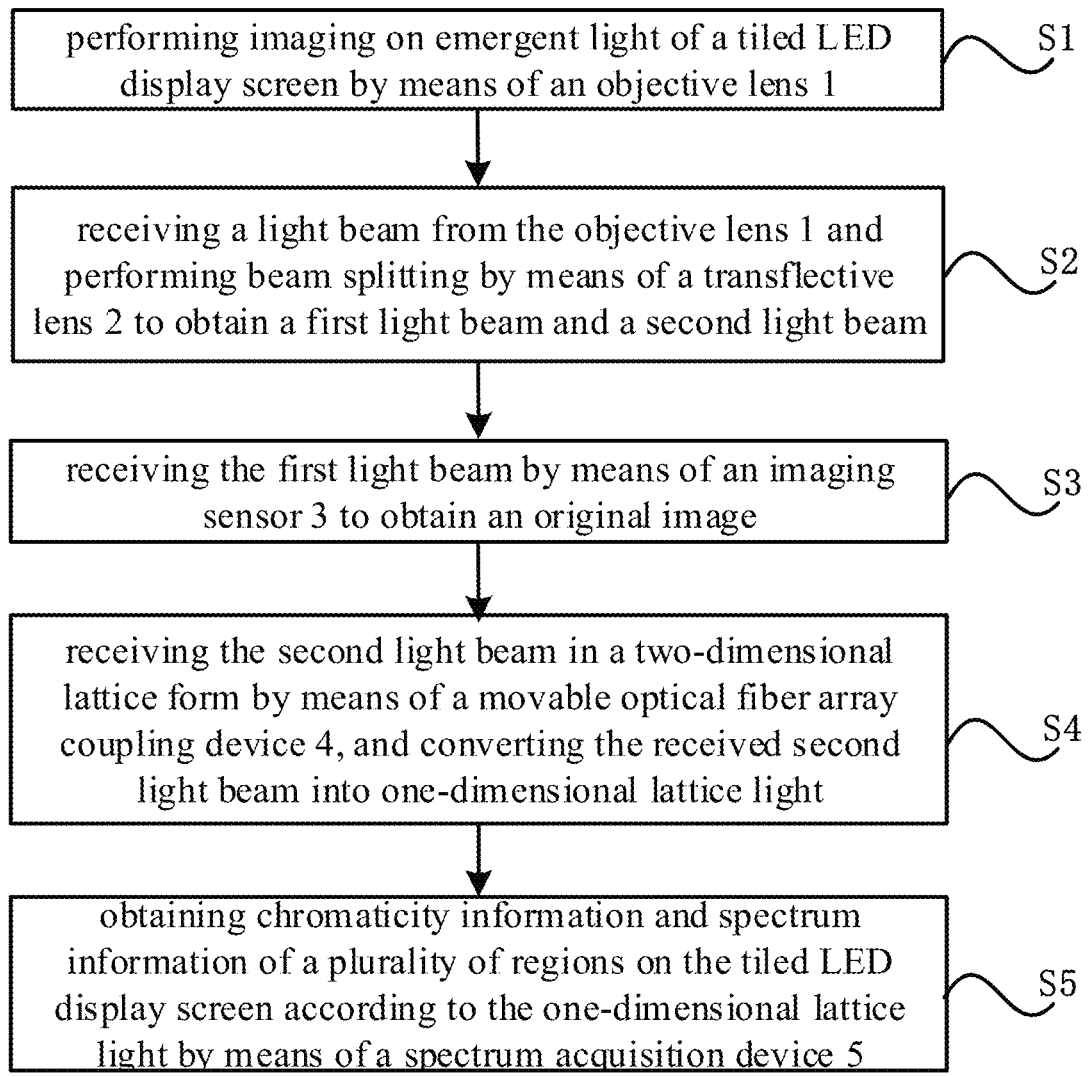
FIG. 1 is a flow chart of a chromaticity measurement method for calibration of a tiled LED display screen in the embodiment of the present application.

1—objective lens; 2—transflective lens; 3—imaging sensor; 4—optical fiber array coupling device; 40—point scanning component; 400—light guide component; 5—spectrum acquisition device; 51—collimation dispersion assembly; 510—collimating lens; 511—dispersion assembly; 512—focusing lens; 52—imaging analysis component; A—tiled LED display screen; A1—No. 1 sub-display screen; A2—No. 2 sub-display screen; B—collecting point of optical fiber array coupling device.

DETAILED DESCRIPTION OF THE EMBODIMENTS

In order to make the purpose, technical solutions and advantages of the embodiments of the present application clearer, the technical solutions in the embodiments of the present application will be described clearly and completely in combination with the drawings in the embodiments of the present application. Obviously, the described embodiments are only a part of the embodiments of the present application, not all of the embodiments. Based on the embodiments in the present application, all other embodiments obtained by a person of ordinary skill in the art without inventive efforts shall fall within the protection scope of the present application.

The present application will be further described below in detail with reference to the drawings in combination with the embodiments.

The present application provides a chromaticity measurement method and device for calibration of a tiled LED display screen, which splits on an emergent light by means of a transflective lens; on the one hand, analysis is performed by means of an imaging sensor, and on the other hand, chromaticity measurement and spectrum measurement are performed by means of a spectrometer, and the spectrometer can easily perform the chromaticity measurement and the spectrum measurement on the emergent light of the LED display screens in different regions by means of a movable design method; and calibration and correction are performed on the imaging sensor on the basis of measurement results of the spectrometer, which has the advantages of low cost, convenient operation and accurate measurement.

In order to achieve the above-mentioned technical effect, the general idea of the present application is as follows.

A chromaticity measurement method for calibration of a tiled LED display screen, which comprises the following steps:
S1: performing imaging on emergent light from a tiled LED display screen by means of an objective lens 1;
S2: receiving a light beam from the objective lens 1 and performing beam splitting by means of a transflective lens 2 to obtain a first light beam and a second light beam;
S3: receiving the first light beam by means of an imaging sensor 3 to obtain an original image;
S4: receiving the second light beam in a two-dimensional lattice form by means of a movable optical fiber array coupling device 4, and converting the received second light beam into one-dimensional lattice light; and
S5: obtaining chromaticity information and spectrum information of a plurality of regions on the tiled LED display screen according to the one-dimensional lattice light by means of a spectrum acquisition device 5.

The present application will be further described below in detail with reference to the drawings in combination with the embodiments.

In the first aspect, as shown in FIG. 1, an embodiment of the present application provides a chromaticity measurement method for calibration of a tiled LED display screen, which comprises the following steps:
S1: performing imaging on emergent light from a tiled LED display screen by means of an objective lens 1;
S2: receiving a light beam from the objective lens 1 and performing beam splitting by means of a transflective lens 2 to obtain a first light beam and a second light beam;
S3: receiving the first light beam by means of an imaging sensor 3 to obtain an original image;
S4: receiving the second light beam in a two-dimensional lattice form by means of a movable optical fiber array coupling device 4, and converting the received second light beam into one-dimensional lattice light; and
S5: obtaining chromaticity information and spectrum information of a plurality of regions on the tiled LED display screen according to the one-dimensional lattice light by means of a spectrum acquisition device 5.

If necessary, the moving direction of the optical fiber array coupling device 4 is perpendicular to an emergence end of the second light beam; that is, a plane of a receiving end of the optical fiber array coupling device 4 is perpendicular to the emergence end of the second light beam.

The imaging sensor 3 can specifically be an RGB imaging sensor, which is configured to receive the first light beam and obtain a corresponding RGB image.

The principle of the embodiment of the present application is as follows: the input light is divided into two paths, one is transmitted to the imaging sensor 3, the other is transmitted to the spectrum acquisition device 5, and the imaging sensor 3 performs calibration and correction through measuring the chromaticity information and the spectrum information of a plurality of regions on the tiled LED display screen obtained according to the one-dimensional lattice light by the spectrum acquisition device 5; and the emergent light is split by means of the transflective lens; on the one hand, analysis is performed by means of the imaging sensor 3, and on the other hand, chromaticity measurement is performed by means of the spectrum acquisition device 5, and the spectrum acquisition device 5 can easily perform the chromaticity information and the spectrum information on the emergent light of the tiled LED display screen in different regions by means of a movable design method; and calibration and correction are performed on the imaging sensor 3 on the basis of the chromaticity information and the spectrum information of a plurality of regions on the tiled LED display screen obtained by the spectrum acquisition device 5 according to the one-dimensional lattice light, which has the advantages of low cost, convenient operation and accurate measurement.

During specific operation, the objective lens 1 performs imaging on the emergent light of the tiled LED display screen, and the transflective lens 2 performs partial transmission on the imaging of the objective lens 1 to obtain the first light beam and performs partial reflection to obtain the second light beam. Of course, the first light beam can be obtained by reflection and the second light beam can be obtained by transmission. The first light beam is obtained by transmission and the second light beam is obtained by reflection as an example for description herein.

On the one hand, the imaging sensor 3 receives and analyzes the first light beam.

On the other hand, an optical fiber array coupling device 4, which is movably arranged at an emergence end of the second light beam of the transflective lens 2, is configured to collect the second light beam in a two-dimensional lattice form and convert the second light beam into one-dimensional lattice light.

The imaging sensor 3 is located on an imaging plane of the first light beam, and the optical fiber array coupling device 4 is configured to be movably arranged on a conjugate image plane of the second light beam.

The two-dimensional lattice of the optical fiber array coupling device 4 can be in the form of M*N, and the translation on the conjugate image plane can be realized by means of devices such as displacement motors or piezoelectric ceramics, so as to achieve registration with a plurality of sub-display screens of the tiled LED display screen under test. Through the registration operation, it can be realized that the optical fiber array coupling device can collect and measure the spectrum information and the chromaticity information of the target region each time, and the target region can be the central region of a plurality of target sub-display screens. For example, when it is necessary to measure the chromaticity information and the spectrum information of one or more target sub-display screens at the same time, the optical fiber array coupling device is moved to register the optical fiber array coupling device with a plurality of sub-display screens of the tiled LED display screen, so that chromaticity information and the spectrum information of one or more target sub-display screens are simultaneously collected and measured through the two-dimensional lattice of the optical fiber array coupling device 4. Through performing spectrum measurement and chromaticity measurement of the plurality of the sub-display screens, integrated rapid measurement is achieved, and rapid color calibration measurement of each of the sub-display screens is realized.

It should be noted that moving the optical fiber array coupling device 4 can collect the sub-display screens in different regions.

The lattice form of the optical fiber array coupling device 4 is set so that light from a plurality of sub-display screens can be collected.

If necessary, the lattice form of the optical fiber array coupling device 4 can be adjusted if needed, and the lattice form of the optical fiber array coupling device 4 can also be configured to collect light from a sub-display screen, which can be adjusted according to usage requirements.

It should be noted that the tiled LED display screen is formed through tiling a plurality of sub-display screens.

In one embodiment, the optical fiber array coupling device 4 can be moved to register the optical fiber array coupling device with the plurality of the sub-display screens, so that the optical fiber array coupling device 4 can simultaneously obtain the chromaticity information and the spectrum information of a plurality of target regions.

In another embodiment, the optical fiber array coupling device 4 can be moved a plurality of times to acquire the chromaticity information and the spectrum information of the target sub-display screen each time the optical fiber array coupling device 4 is moved until the chromaticity information and the spectrum information are acquired at least once for each of the sub-display screens.

Specifically, the step of moving the optical fiber array coupling device 4 for a plurality of times until the chromaticity information and the spectrum information are acquired at least once for each of the sub-display screens comprises the following steps:
calculating a distance and a number of times the optical fiber array coupling device 4 needs to move according to the number of the sub-display screens; and
moving the optical fiber array coupling device 4 for a plurality of times according to the distance and the number of times until the chromaticity information and the spectrum information are acquired at least once for each of the sub-display screens.

Figure 5:
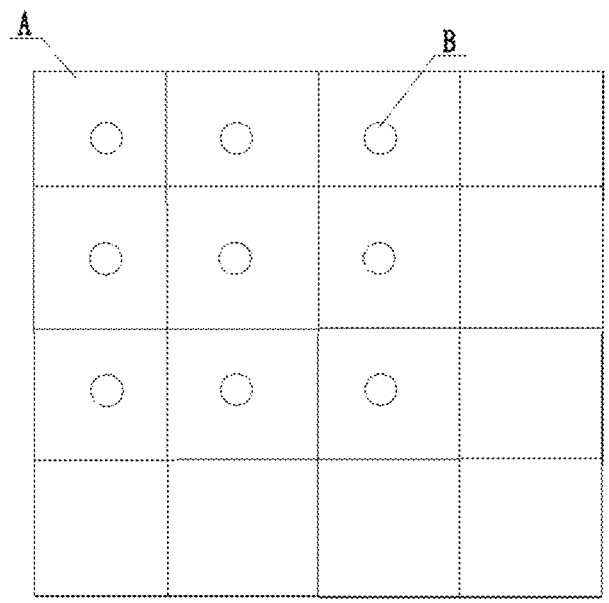
FIG. 5 is a schematic diagram of collecting operation of an optical fiber array coupling device of a chromaticity measurement device for calibration of a tiled LED display screen in the embodiment of the present application.
Figure 6:
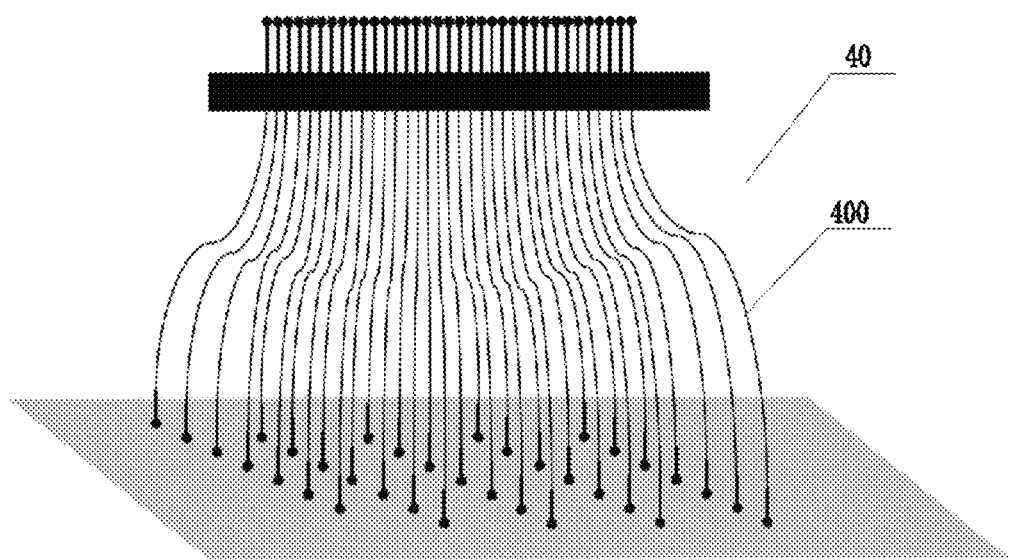
FIG. 6 is a schematic diagram of an optical fiber array coupling device of a chromaticity measurement device for calibration of a tiled LED display screen in the embodiment of the present application.

FIG. 5 is a specific implementation of the above-mentioned embodiment. Assuming that the two-dimensional lattice of the optical fiber array coupling device is in the form of 3*3 and the tiled display screen is a 4*4 tiled screen, the optical fiber array coupling device can be moved four times to obtain the spectrum information of all the sub-display screens. For example, the optical fiber array coupling device is moved for the first time to make the optical fiber array coupling device obtain the spectrum information of 9 sub-display screens in total at the upper left corner of the tiled screen of 3*3, the optical fiber array coupling device is moved for the second time to make the optical fiber array coupling device obtain the spectrum information of 9 sub-display screens in total at the upper right corner of the tiled screen of 3*3, the optical fiber array coupling device is moved for the third time to make the optical fiber array coupling device obtain the spectrum information of 9 sub-display screens in total at the lower left corner of the tiled screen of 3*3, and the optical fiber array coupling device is moved for the fourth time to make the optical fiber array coupling device obtain the spectrum information of 9 sub-display screens in total at the lower right corner of the tiled screen of 3*3, so that each of the sub-display screens can be measured at least once through moving the optical fiber array coupling device four times.

Further, the method further comprises the following steps:
obtaining a calibration matrix of the corresponding region of the tiled LED display screen according to the spectrum information and the chromaticity information of the corresponding region of the tiled LED display screen; and
performing calibration on a GRB image according to the calibration matrix.

Specifically, the calibration matrix is obtained according to the chromaticity information measured by the spectrometer, that is, the standard chromaticity information and the original image information obtained by the color camera, and then the calibration matrix is adopted to calibrate the original image obtained by the color camera.

It should be noted that the region corresponding to the tiled LED display screen specifically refers to the sub-display screen on the tiled LED display screen corresponding to the second light beam collected by the optical fiber array coupling device 4.

In a second aspect, as shown in FIGS. 2 to 6, the embodiment of the present application further provides a chromaticity measurement device for calibration of a tiled LED display screen, which is configured to implement the chromaticity measurement method for calibration of the tiled LED display screen mentioned in the first aspect. The chromaticity measurement device comprises:
an objective lens 1, which is configured to perform imaging on emergent light from a tiled LED display screen;
a transflective lens 2, which is configured to perform beam splitting on a light beam received from the objective lens 1 to obtain a first light beam and a second light beam;
an imaging sensor 3, which is configured to perform imaging according to the first light beam;
an optical fiber array coupling device 4, which is movably arranged at an emergence end of the second light beam, and configured to collect the second light beam in a two-dimensional lattice form, and convert the received second light beam into one-dimensional lattice light; and
a spectrum acquisition device 5, which is configured to obtain chromaticity information and spectrum information of a plurality of regions on the tiled LED display screen according to the one-dimensional lattice light.

If necessary, the moving direction of the optical fiber array coupling device 4 is perpendicular to an emergence end of the second light beam; that is, a plane of a receiving end of the optical fiber array coupling device 4 is perpendicular to the emergence end of the second light beam.

The imaging sensor 3 can specifically be an RGB imaging sensor, which is configured to receive the first light beam and obtain a corresponding RGB image.

Figure 2:
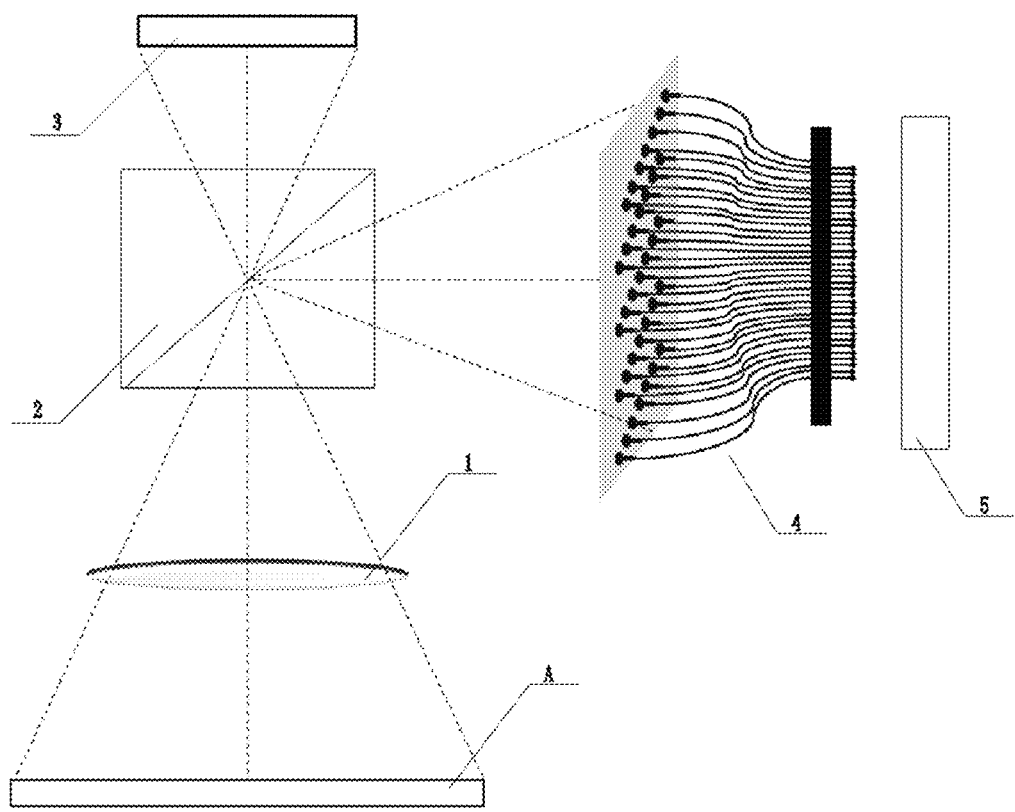
FIG. 2 is a flow chart of a chromaticity measurement device for calibration of a tiled LED display screen in the embodiment of the present application.
Figure 3:
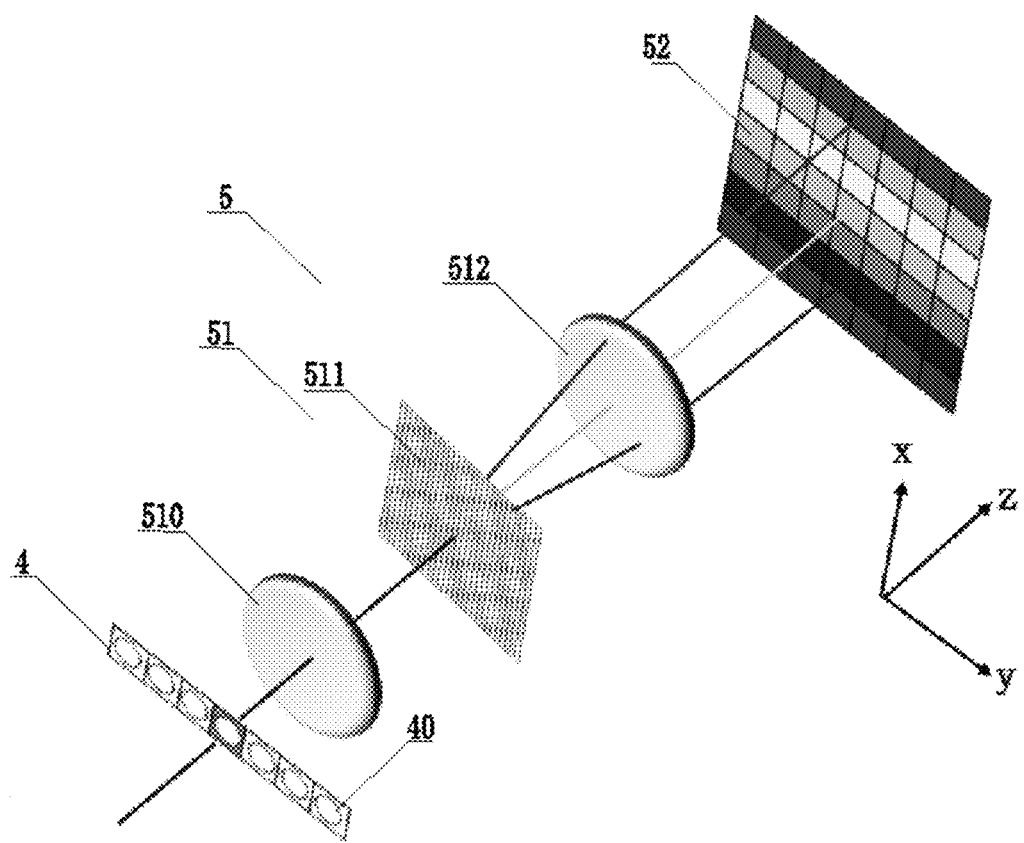
FIG. 3 is a schematic diagram of operation of an optical fiber array coupling device and a spectrum acquisition device of a chromaticity measurement device for calibration of a tiled LED display screen in the embodiment of the present application.

It should be noted that, in FIG. 2 of the drawings of the specification, component A is a tiled LED display screen; and
the tiled LED display screen is formed through tiling a plurality of sub-display screens.

The principle of the embodiment of the present application is as follows: the input light is divided into two paths, one is transmitted to the imaging sensor 3, the other is transmitted to the spectrum acquisition device 5, and the imaging sensor 3 performs calibration and correction through measuring the chromaticity information and the spectrum information of a plurality of regions on the tiled LED display screen obtained according to the one-dimensional lattice light by the spectrum acquisition device 5; and
the emergent light is split by means of the transflective lens; on the one hand, analysis is performed by means of the imaging sensor 3, and on the other hand, chromaticity measurement and spectrum measurement is performed by means of the spectrum acquisition device 5, and the spectrum acquisition device 5 can easily perform the chromaticity measurement and the spectrum measurement on the emergent light of the tiled LED display screen in different regions by means of a movable design method; and calibration and correction are performed on the imaging sensor 3 on the basis of the chromaticity information and the spectrum information of a plurality of regions on the tiled LED display screen obtained by the spectrum acquisition device 5 according to the one-dimensional lattice light, which has the advantages of low cost, convenient operation and accurate measurement.

During a specific operation, the objective lens 1 performs imaging on the emergent light from the tiled LED display screen, and the transflective lens 2 performs partial transmission on the imaging of the objective lens 1 to obtain the first light beam and performs partial reflection to obtain the second light beam. Of course, the first light beam can be obtained by reflection and the second light beam can be obtained by transmission. The first light beam is obtained by transmission and the second light beam is obtained by reflection as an example for description herein.

On the one hand, the imaging sensor 3 receives and analyzes the first light beam.

On the other hand, an optical fiber array coupling device 4, which is movably arranged at an emergence end of the second light beam of the transflective lens 2, is configured to collect the second light beam in a two-dimensional lattice form and convert the second light beam into one-dimensional lattice light.

The imaging sensor 3 is located on an imaging plane of the first light beam, and the optical fiber array coupling device 4 is configured to be movably arranged on a conjugate image plane of the second light beam.

The two-dimensional lattice of the optical fiber array coupling device 4 can be in the form of M*N, and the translation on the conjugate image plane can be realized by means of devices such as displacement motors or piezoelectric ceramics, so as to achieve registration with a plurality of sub-display screens of the tiled LED display screen under test. Through the registration operation, it can be realized that the optical fiber array coupling device can collect the spectrum information and the chromaticity information of the target region each time, and the target region can be the central region of a plurality of target sub-display screens. For example, when it is necessary to measure the chromaticity information and the spectrum information of one or more target sub-display screens at the same time, the optical fiber array coupling device is moved to register the optical fiber array coupling device with a plurality of sub-display screens of the tiled LED display screen, so that chromaticity information and the spectrum information of one or more target sub-display screens are simultaneously collected through the two-dimensional lattice of the optical fiber array coupling device 4. Through performing chromaticity measurement and spectrum measurement of the plurality of the sub-display screens, integrated rapid measurement is achieved, and rapid color calibration measurement of each of the sub-display screens is realized.

When moving, through analyzing the number of the sub-display screens in the tested tiled LED display screen, the distance and times that need to move are calculated to ensure that each of the sub-display screens can obtain the chromaticity information and the spectrum information at least once, so as to perform chromaticity measurement and spectrum measurement on any number of the tiled LED display screens.

Figure 4:
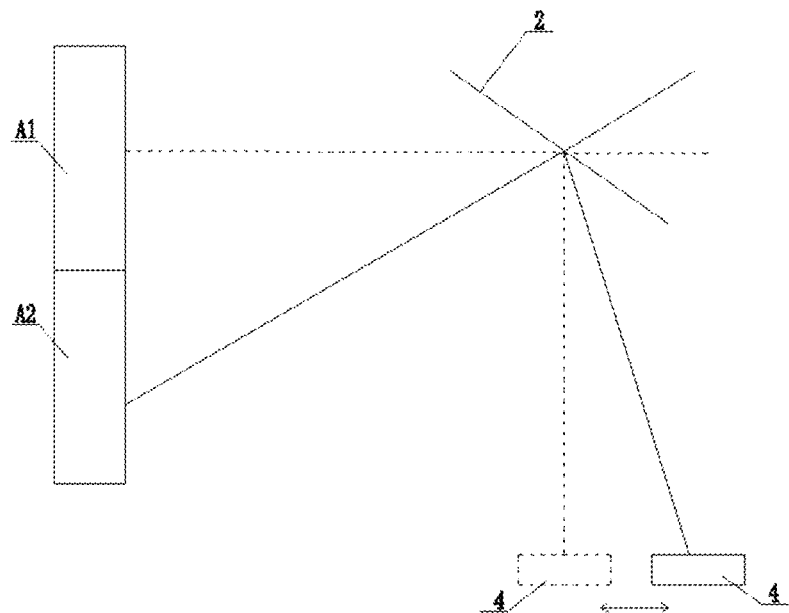
FIG. 4 is a schematic diagram of movement of an optical fiber array coupling device of a chromaticity measurement device for calibration of a tiled LED display screen in the embodiment of the present application.

It should be noted that, as shown in FIG. 4 of the drawings of the specification, moving the optical fiber array coupling device 4 can collect the sub-display screens in different regions.

As shown in FIG. 5 of the drawings of the specification, the lattice form of the optical fiber array coupling device 4 is set so that light from a plurality of sub-display screens can be collected.

If necessary, the lattice form of the optical fiber array coupling device 4 can be adjusted if needed, and the lattice form of the optical fiber array coupling device 4 can also be configured to collect light from a sub-display screen, which can be adjusted according to usage requirements.

In one embodiment, the optical fiber array coupling device 4 can be moved, and the optical fiber array coupling device is registered with the plurality of the sub-display screens, so that the optical fiber array coupling device 4 can simultaneously obtain the chromaticity information and the spectrum information of a plurality of target regions.

In another embodiment, the optical fiber array coupling device 4 can be moved a plurality of times to acquire the chromaticity information and the spectrum information of the target sub-display screen each time the optical fiber array coupling device 4 is moved until the chromaticity information and the spectrum information are acquired at least once for each of the sub-display screens.

Specifically, the optical fiber array coupling device 4 comprises a point scanning component 40, which is configured to collect the second light beam in a two-dimensional lattice form to obtain the two-dimensional lattice light, and convert the two-dimensional lattice light into the one-dimensional lattice light for emergence.

Specifically, the point scanning component 40 comprises:
a plurality of light guide components 400;
one ends of the plurality of the light guide components 400 are arranged in a two-dimensional lattice form, and are configured to collect the second light beam to obtain the two-dimensional lattice light; and
the other ends of the plurality of the light guide components 400 are arranged in a straight line, so as to convert the two-dimensional lattice light into one-dimensional lattice light for emergence.

Specifically, the spectrum acquisition device 5 comprises:
a collimation dispersion assembly 51, which is configured to perform collimation processing, dispersion processing and focusing processing on the one-dimensional lattice light;
an imaging analysis component 52, specifically a spectrometer, which is configured to image and analyze the one-dimensional lattice light subjected to the collimation processing, dispersion processing, and focusing processing, so as to obtain the spectrum information and the chromaticity information of the one-dimensional lattice light, and also obtain the spectrum information and chromaticity information of the two-dimensional lattice light.

It should be noted that the collimating dispersion component 51 comprises:
a collimating lens 510, which is configured to perform collimation processing;
a dispersion assembly 511, which is configured to perform dispersion processing; and
a focusing lens 512, which is configured to perform focusing processing.

In a specific implementation, the front end of the point scanning assembly 40 collects light to obtain the two-dimensional lattice light. Assuming that the point scanning assembly 40 is arranged in an M*N array form, that is, the light in the two-dimensional lattice light is also arranged in an M*N array form, and then the two-dimensional lattice light is emitted in the form of the one-dimensional lattice light during transmission. Since the light in the two-dimensional lattice is arranged in the form of M*N array, the one-dimensional lattice light is a one-dimensional structure of 1*MN.

It should be noted that M and N in M*N are positive integers not less than 1.

For example, M*N can be 3*3, 4*6, 5*7 or other array structures.

When M*N is 3*3, that is, 3 rows and 3 columns, the front end of the point scanning component 40 can collect the optical information of 9 spatial points, and the rear end of the point scanning component 40 emits the one-dimensional lattice light of 9*1.

In addition, according to the lattice structure formed by M*N, the lattice can be arranged in a rectangle, a circle, or other irregular shapes in space.

It should be noted that relational terms such as "first" and "second" are only for distinguishing one entity or operation from another entity or operation in the present application, and do not necessarily require or imply any such actual relationship or order between these entities or operations. Moreover, the terms "include", "comprise" or any other variants thereof are intended to cover non-exclusive inclusion, so that a process, method, article or device comprising a series of elements not only comprises those elements, but also comprises those that are not explicitly listed, or further comprises elements inherent to the process, method, article, or device. If there are no more restrictions, the elements defined by the sentence "comprising a . . . " does not exclude the existence of other same elements in the process, method, article, or device comprising the elements.

The above-mentioned are only the embodiments of the present application, so that those skilled in the art can understand or implement the present application. For those skilled in the art, various modifications to these embodiments will be obvious, and the general principles defined herein can be implemented in other embodiments without departing from the spirit or scope of the present application. Therefore, the present application will not be limited to the embodiments shown in this document, but will be subject to the widest scope consistent with the principles and novel features applied herein.

The invention claimed is:

1. A chromaticity measurement method for calibration of a tiled LED display screen, the method comprising:
   performing imaging on emergent light from a tiled LED display screen with an objective lens (1);
   receiving a light beam from the objective lens (1) and performing beam splitting with a transflective lens (2) to obtain a first light beam and a second light beam;
   receiving the first light beam with an imaging sensor (3) to obtain an original image;
   receiving the second light beam in a two-dimensional lattice form with a movable optical fiber array coupling device (4), and converting the received second light beam into one-dimensional lattice light; and
   obtaining chromaticity information and spectrum information of a plurality of regions on the tiled LED display screen according to the one-dimensional lattice light with a spectrum acquisition device (5).

2. The chromaticity measurement method for calibration of the tiled LED display screen according to claim 1, wherein
   the imaging sensor (3) is located on an imaging plane of the first light beam, and the optical fiber array coupling device (4) is configured to be movably arranged on a conjugate image plane of the second light beam.

3. The chromaticity measurement method for calibration of the tiled LED display screen according to claim 1, wherein the tiled LED display screen is formed through tiling a plurality of sub-display screens; and
   receiving the second light beam in the two-dimensional lattice form with the movable optical fiber array coupling device (4), and converting the second light beam into one-dimensional lattice light comprises:
   moving the optical fiber array coupling device (4), and registering the optical fiber array coupling device (4) with the plurality of the sub-display screens, so that the optical fiber array coupling device (4) can simultaneously obtain the chromaticity information and the spectrum information of a plurality of target regions.

4. The chromaticity measurement method for calibration of the tiled LED display screen according to claim 1, wherein the tiled LED display screen is formed through tiling a plurality of sub-display screens; and
   receiving the second light beam in the two-dimensional lattice form with the movable optical fiber array coupling device (4), and converting the second light beam into one-dimensional lattice light comprises:
   moving the optical fiber array coupling device (4) for a plurality of times to acquire the chromaticity information and the spectrum information of the target sub-display screen each time the optical fiber array coupling device (4) is moved until the chromaticity information and the spectrum information are acquired at least once for each of the sub-display screens.

5. The chromaticity measurement method for calibration of the tiled LED display screen according to claim 4, wherein moving the optical fiber array coupling device (4) for the plurality of times to acquire the chromaticity information and the spectrum information of the target sub-display screen each time the optical fiber array coupling device (4) is moved until the chromaticity information and the spectrum information are acquired at least once for each of the sub-display screens comprises:
   calculating a distance and a number of times the optical fiber array coupling device (4) needs to move according to the number of the sub-display screens; and
   moving the optical fiber array coupling device (4) for a plurality of times according to the distance and the number of times until the chromaticity information and the spectrum information are acquired at least once for each of the sub-display screens.

6. The chromaticity measurement method for calibration of the tiled LED display screen according to claim 1, wherein the method further comprises:
   obtaining a calibration matrix of the corresponding region of the tiled LED display screen according to the spectrum information and the chromaticity information of the corresponding region of the tiled LED display screen; and
   calibrating the original image according to the calibration matrix.

7. A chromaticity measurement device for calibration of a tiled LED display screen, the device comprising:
   an objective lens (1) configured to perform imaging on emergent light from a tiled LED display screen;
   a transflective lens (2) configured to perform beam splitting on a light beam received from the objective lens (1) to obtain a first light beam and a second light beam;

an imaging sensor (3) configured to perform imaging of the first light beam;

an optical fiber array coupling device (4), which is movably arranged at an emergence end of the second light beam, and configured to collect the second light beam in a two-dimensional lattice form, and convert the received second light beam into an one-dimensional lattice light; and a spectrum acquisition device (5) configured to obtain chromaticity information and spectrum information of a plurality of regions on the tiled LED display screen according to the one-dimensional lattice light.

8. The chromaticity measurement device for calibration of the tiled LED display screen according to claim 7, wherein the imaging sensor (3) is located on an imaging plane of the first light beam, and the optical fiber array coupling device (4) is configured to be movably arranged on a conjugate image plane of the second light beam.

9. The chromaticity measurement device for calibration of the tiled LED display screen according to claim 7, wherein the optical fiber array coupling device (4) comprises the point scanning component (40) configured to collect the second light beam in the two-dimensional lattice form to obtain the two-dimensional lattice light and convert the two-dimensional lattice light into the one-dimensional lattice light for emergence.

10. The chromaticity measurement device for calibration of the tiled LED display screen according to claim 9, wherein the point scanning component (40) comprises:

a plurality of light guide components (400) wherein one ends of the plurality of the light guide components (400) are arranged in the two-dimensional lattice form, and are configured to collect the second light beam to obtain the two-dimensional lattice light; and the other ends of the plurality of the light guide components (400) are arranged in a straight line so as to convert the two-dimensional lattice light into the one-dimensional lattice light for emergence.

* * * * *